3,609,806
ORIFICE PLATES AND WORM EXTRUDERS
CONTAINING SAME
Heinz Schippers and Erich Lenk, Remscheid-Lennep,
Germany, assignors to Barmag Barmer Maschinen-
fabrik Aktiengesellschaft, Wuppertal, Germany
Filed May 5, 1969, Ser. No. 821,609
Claims priority, application Germany, May 4, 1968,
G 67 52 197
Int. Cl. B29f 3/01
U.S. Cl. 18—12 B                                    17 Claims

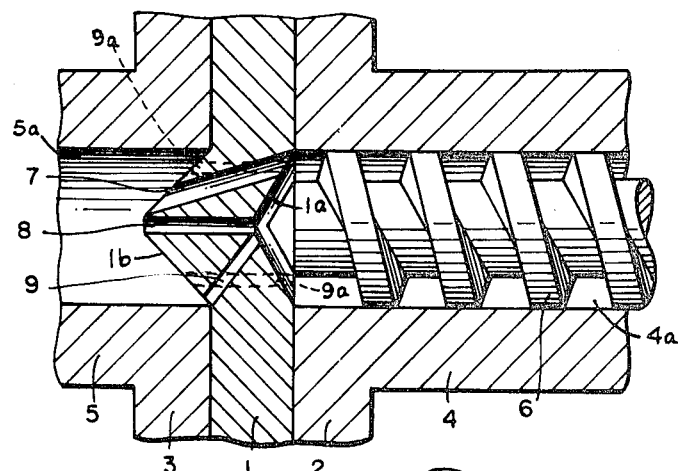
FIG. 1
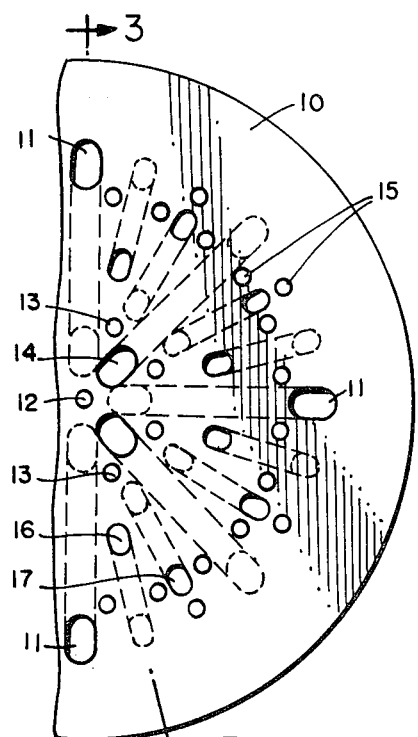
FIG. 2
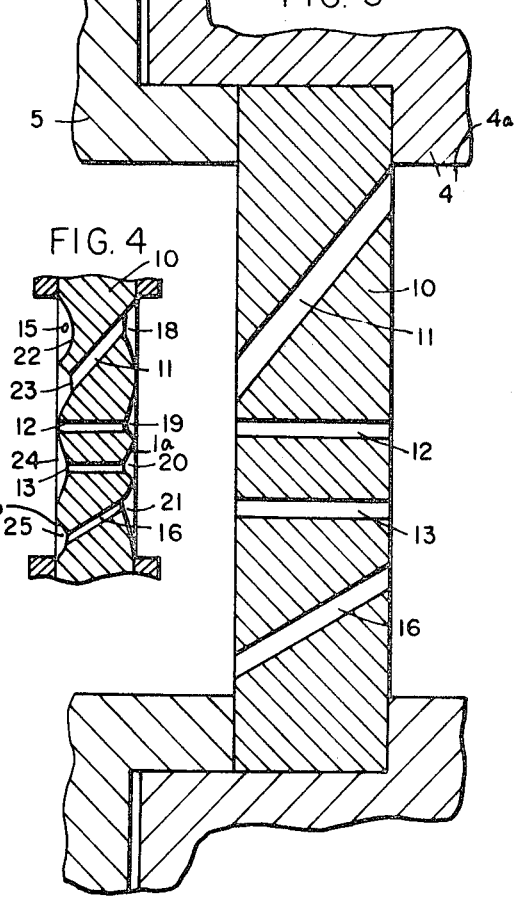
FIG. 3
FIG. 4
FIG. 5
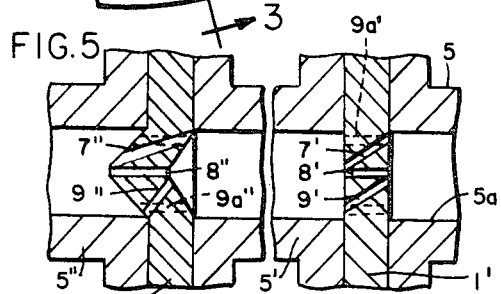
INVENTORS:
HEINZ SCHIPPERS
ERICH LENK United States Patent Office 3,609,806
Patented Oct. 5, 1971

ABSTRACT OF THE DISCLOSURE

Orifice plate for worm extruders and extruders containing same for the homogenization and temperature uniformity of the melt flow of thermoplastic materials discharged therefrom, characterized by flat, domed or conical orifice plate secured in or to the worm cylinder directly after the worm end and further characterized by orifices parallel to the axis of the worm cylinder with further oblique orifices extending axially diagonally, in which system the orifices axially parallel to the worm cylinder are arranged in each case in the zone of respective entrant and discharge ends of the axially diagonal orifices.

INTRODUCTION

It is a known practice in the case of single-worm extruders to arrange at the ejection end of the extruder cylinder an orifice plate preceding the extrusion die. Sometimes orifice plates, whose bore pattern provides larger diameter orifices in the outer zone and smaller diameter orifices toward the center, are used. The objective thereof is to facilitate the flow of the molten plasticized material in the border zone, in order to achieve uniform flow relations. Moreover, the material emerging from the extruder cylinder should be exposed over the entire flow cross section to an additional mixing and heating effect, before it emerges into the feed conduit to the die. The uniformity of temperature is of great importance for a velocity profile which is as balanced as possible over the flow cross section of the melt. Differing temperatures correspondingly promote differing viscosities and thereby uneven velocities over the melt flow cross section. The effect of the known orifice plates, however, does not, in many cases, suffice to bring the delivered melt to a uniform temperature and viscosity, nor do they induce adequate homogenization of the velocity profile.

U.S. Pat. No. 2,971,219 discloses a mixing device in a spinning head embodying a distributor plate in spinning nozzle structures, wherein the outer melt layers cooled by heat transfer to the environment are conducted inward and the uncooled core of the melt flows outward. This distributor plate is seated in the spinning head casing, separated from the nozzle plate solely by the perforated casing bottom. In order to show the drawbacks of this arrangement, it is necessary to go into more detail about the temperature and flow conditions in the melt between worm and extrusion die. The causes of the temperature differences in the melt stream are not, at least are not wholly, the heat losses to the outside, especially since both the cylinder and also the connection pieces, and possibly also necessary distributor lines between the extrusion cylinder and the die, are surrounded by heating devices or, if need be, insulating jackets. The latter are designed so that the heat losses are just compensated. The reason for the temperature differences is rather to be seen in the inner friction of the melt and in the heat storage in the worm. Also the melt constituents flowing off from the worm end, which previously were in direct contact with the worm surface, are united with the hotter core in the melt flow cross section. It was ascertained that under some circumstances there occur flow temperature differences of up to 20° C. between core and mantle of the melt.

It is well known that all plastics undergo harmful changes in their molecular structure if they stay for a relatively long time in the upper range of the flow temperature. The conditions are still more unfavorable in the case of plastics whose disintegration temperature lies just a little above the flow temperature range, as, for example, in the case of polyvinyl chloride. Because the flow interval of the melt from the worm to the extrusion die or, in particular, also to a spinning nozzle or to its distributor plate, as described in U.S. Pat. No. 2,971,- 219, is frequently relatively long, the danger of molecular modification is a serious problem. In some cases, serious molecular deterioration or decomposition may result as a consequence of the correspondingly long period of subjection to these elevated temperatures. These molecular alterations or damages express themselves in inadequate or differing mechanical properties in the plastic products flowing from different die cross-section zones, as, for example, in differing specific strength of products that have been extruded next to one another. A further substantial disadvantage of the arrangement described in U.S. Pat. No. 2,971,219 lies in the short distance from the distributor plate to the nozzle plate. A distribution of the melt does, to be sure, take place in this case to a certain degree. However, the path and time from the emergence from the distributor plate to the entry into the nozzle pla'e do not suffice to give the discharged, temperature-differing melt strings adequate mixing or exchanging heat, especially since only the uncooled hotter melt is conducted from the inside outward and the cooled melt is conducted from the outside inward. In the final effect, on the one hand, the melt streams of higher temperature from the original feed side, central zone lie just as closely immediately next to one another in the mantle zone on the discharge side. On the other hand, the melt streams of lower temperature from the feed side, outer zone are fed to the nozzle plate just as closely contiguous to one another as previously in the feed side. The shallow annular gap on the underside of the distributor plate does not provide any remedy here.

BRIEF DESCRIPTION OF INVENTION

This invention has as its underlying objective the provision of orifice plates with the desired mixing effect and the avoidance of the above-described drawbacks.

According to the present invention, a flat, domed or, in particular, conical orifice plate is secured in or on the worm cylinder immediately downstream of the worm end. In addition to orifices parallel to the worm cylinder axis, the plate is provided with further orifices extending diagonally at an angle thereto. The orifices lying axially parallel to the worm cylinder are in each case arranged in the zone of entrant or discharge ends of the angular orifices. In this way it is assured that, from the orifice plates according to the invention, there emerges alternately in each case a melt string from the central zone of the melt flow entering the orifice plate beside a melt string from the circumferential zone and a melt string from the circumferential zone of the melt flow entering the orifice plate beside a melt string from the central zone. The adaptation of the orifice plate to the shape of the worm end by its conical design and its fastening in the immediate vicinity of the worm end favors the mixing of the melt streams to unifying their temperature so early that the harmful action of the high temperature, hitherto concentrated on the core of the melt flow, does not occur, whereby the molecular structure of the polymer is not adversely altered. Furthermore, through the greater spacing of the orifice plate from the entry into the extrusion die or into the extrusion nozzle, melt partial streams of differing temperature and finely distributed over the whole flow cross section have sufficient time to interchange their heat among one another. There is thereby achieved a melt homogeneous in every respect at the entry into the extrusion die with an optimally balanced velocity profile over the flow cross section.

In order to avoid orifice plate surfaces between the orifice openings, on which the plasticized material could accumulate, the orifices on the upstream, worm side and/or on the downstream, die side may be countersunk. The depressions touch or overlap in places. The depressions of the orifices entering or emerging in the central zone of the plate reach as far as or in proximity to the center of the orifice plate. These features prevent relatively long staying times of the melt or melt constituents on the hot orifice plate and the consequent decomposition of the melt and/or constituents thereof.

Furthermore, the orifice cross sections of the orifice plate should become larger as the orifices become longer in order to attune the orifices of the plate to one another in such a way that the flow resistances in all the orifices are approximately equal.

Moreover, there should be provided for the melt conduit between the orifice plate and the extrusion die a length such that there is a residence time of at least one minute of the melt in the conduit. In this manner there is obtained, in contrast to known apparatus, an optimal temperature uniformity and homogenization of the melt.

In correspondence to the material to be extruded or the length of the flow interval between worm and die, it can be advantageous under some circumstances to provide two or more orifice plates in succession and spaced from one another in the worm cylinder or immediately following it.

DESCRIPTION OF DRAWINGS

In the drawings there are illustrated schematically several preferred embodiments of the invention.

In the drawings:

FIG. 1 is a diametric cross section in fragment through the downstream end of an extrusion cylinder of an extrusion machine, through the upstream end of the extrusion die attachment, and through the orifice plate interposed therebetween, said orifice plate having a conical center portion containing the axially diagonal and axially extending orifices or passages;

FIG. 2 is a fragmentary front elevation of a disc-shaped orifice plate;

FIG. 3 is a diametric section in fragment of the downstream end of an extrusion cylinder of an extrusion machine and the upstream end of the extrusion die attachment with the orifice plate of FIG. 2 mounted therebetween, said orifice plate being shown in section taken on section plane 3—3 of FIG. 2;

FIG. 4 is a fragmentary diametric cross section similar to FIG. 3, the orifice plate of which has countersunk or recessed portions on the respective upstream and downstream faces; and FIG. 5 is a diametric section of an embodiment similar to FIG. 1 but containing two additional orifice plates.

DESCRIPTION OF PREFERRED EMBODIMENTS

Referring to FIG. 1, the conical orifice plate 1 is arranged between the fastening flanges 2 and 3 of the worm cylinder 4 and of the tubular connecting member 5 for the extrusion die closely downstream of the end of the worm or screw 6. The connecting member 5 has a cylindrical, discharge-melt-flow passage 5a which preferably extends coaxially with the worm cylinder 4 and in the same axial direction as the axial passages 8 and 9a. The axially diagonal orifice 7 conducts relatively cool melt from the mantle zone 4a of the passage of the worm cylinder 4 and the orifices 8 and 9 conduct hotter melt from the core zone of the worm-fed melt stream. Of the two latter, the first, axial orifice 8 conducts the melt axially from upstream to downstream central zones, and the second, axially diagonal orifice 9 conducts melt from the upstream central zones to the downstream, outer or peripheral zone. In the latter zone, orifices 9a axially parallel to the axis worm cylinder and axial passage 8 also simultaneously conduct cooler melt directly from upstream to downstream mantle zones, whereby over the entire flow cross section many partial streams of melt of differing temperature are brought together and take on a uniform temperature downstream of the orifice plate. The conical portion of the orifice plate 1 may have one or more axially diagonal orifice 7 and one or more axially diagonal orifice 9. The orifice-containing portion of the orifice plate 1 has a conically countersunk upstream face 1a and a conical downstream face 1b.

Referring to the embodiment of FIGS. 2 and 3, the flat, disc-shaped orifice is seated directly in a cylindrical, countersunk bore of the cylinder 4, and similarly is contiguous to the downstream end of the worm (not shown in these figures). From FIG. 3, it can be seen that melt from the cooler melt mantle 4a passes through the oblique or axially diagonal orifices 11 and discharges therefrom next to the central melt string conducted through the axial, central orifice 12 and next to the hotter melt strings conducted through the axially parallel orifices 13. Conversely (FIG. 2) hotter melt enters the oblique or axially diagonal orifices 14 and discharges into the downstream mantle zone and mixes there with cooler melt from the axially parallel, radially outer orifices 15. In the same manner, the hotter partial streams from the oblique or axially diagonally, outwardly directed orifices 16 mix with the cooler partial streams discharged from the axially parallel orifices 15. Further, the cooler partial streams discharged from the smaller cross-section, radially intermediate, oblique or axially diagonally, inwardly directed orifices 17 mix with the hotter partial streams of the axially parallel, radially intermediate orifices 13. In the sense of a mixing of differently temperatured partial streams, all the bores are distributed over the entire orifice plate in the same sense as is to be seen from FIG. 2. Diameters and lengths of all the bores are attuned to one another in such a way that their respective flow resistances are approximately equal.

FIG. 4 shows a cross-section of modified orifice plate generally similar to the plate of FIGS. 2 and 3. The orifice plate has on the upstream and downstream faces spherical or symmetric and/or non-symmetric conical recesses or countersunk zones 18, 19, 20, 21, 22, 23, 24 and 25, in which in each case at least one of the orifices 11, 12, 13, 14, 15, 16 or 17 begin or terminate. Only one face or only part of the orifices may have these recesses, if desired.

The recesses or countersunk zones preferably touch or intersect along portions of respective peripheries thereof, as can be seen from the sharp edge intersections in FIG. 4. These recesses or countersunk zones, which are contiguous to the radially central portion of the orifice-containing portion of the orifice plate have radial inner peripheral portions extending up to or at least contiguous to the center of the orifice-containing portion of said plate. The latter is illustrated on the downstream face 1b of the embodiment of FIG. 4 wherein the radially inner peripheral edges of the recess or countersunk zones 23 and 24 intercept the peripheral edge of the axially central orifice 12. On the upstream face 1a, the radially inner peripheral portions of the recesses or countersunk zones 18 and 20 intersect or approximately intersect the contiguous peripheral edges of the recess or countersunk zone 19, which is in the radially central portion of the upstream face.

In the embodiment of FIG. 5, the extruder and orifice plate immediately downstream of the worm are the same as shown in FIG. 1. The tubular connecting member 5 is composed of two additional tubular, axially aligned tubular segments 5' and 5" with two additional orifice plates 1' and 1" interposed therebetween. The orifice plate 1' is a flat or planar orifice plate having diagonal passages 7' and 9' respectively similar to the previously described diagonal passages 7 and 9. The orifice plate 1' also contains axial passages 8' and 9a' similar to the passages 8 and 9a, also previously described.

The orifice plate 1" is identical with the orifice plate 1. Its conical portion contains axial passages 8" and 9a" and axially diagonal passages 7" and 9" corresponding with the previously described passages 8, 9a, 7 and 9, respectively.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. An orifice plate for worm extruders adapted to improve homogenization and temperature uniformity of melt flow of thermoplastic materials passed therethrough, said orifice plate comprising a plate member having an orifice-containing portion including a first group of axially diagonal orifices extending from the periphery to the central part of said portion, a second group of axially diagonal orifices extending from the central part to the periphery of said portion, and a plurality of axially parallel orifices extending through both the central part and the periphery of said portion.

2. An orifice plate as claimed in claim 1 wherein the orifice containing portion of said orifice plate has substantially flat upstream and downstream faces.

3. An orifice plate for worm extruders adapted to improve homogenization and temperature uniformity of melt flow of thermoplastic materials passed therethrough, said orifice plate comprising a plate member having an orifice-containing portion with orifices extending axially and diagonally axially therethrough, said axially extending orifices having upstream, melt entrant ends and downstream, melt discharge ends contiguous to an upstream, melt entrant end or a downstream, melt discharge end of respective axially diagonal orifices, said orifice-containing portion having substantially flat upstream and downstream faces, at least a portion of said orifices having on at least one of the upstream and downstream faces of said plate countersunk zones about the orifice openings.

4. An orifice plate as claimed in claim 3 wherein peripheral portions of adjacent countersunk zones substantially touch or overlap and said countersunk zones contiguous to the radially central zone of said orifice-containing portion at least approximately intersect the radial center of said portion.

5. An orifice plate as claimed in claim 3 wherein the cross sections of said orifices having the longer lengths are greater than the cross sections of said orifices having the shorter lengths, said cross section being predetermined to provide substantially equal flow resistance in all of said orifices.

6. An orifice plate for worm extruders adapted to improve homogenization and temperature uniformity of melt flow of thermoplastic materials passed therethrough, said orifice plate comprising a plate member having an orifice-containing portion with orifices extending axially and diagonally axially therethrough, said axially extending orifices having upstream, melt entrant ends and downstream, melt discharge ends contiguous to an upstream, melt entrant end or a downstream, melt discharge end of respective axially diagonal orifices, at least a portion of said orifices having countersunk zones about the orifice openings in at least one of the faces of said plate.

7. An orifice plate as claimed in claim 1 wherein the cross sections of said orifices having the longer lengths are greater than the cross sections of said orifices having the shorter lengths, said cross sections being predetermined to provide substantially equal flow resistance in all of said orifices.

8. An orifice plate for worm extruders adapted to improve homogenization and temperature uniformity of melt flow of thermoplastic materials passed therethrough, said orifice plate comprising a plate member having an orifice-containing portion with orifices extending axially and diagonally axially therethrough, said axially extending orifices having upstream, melt entrant ends and downstream, melt discharge ends contiguous to an upstream, melt entrant end or a downstream, melt discharge end of respective axially diagonal orifices, the orifice-containing portion of said orifice plate having a conically countersunk upstream face and a conical downstream face.

9. In an extruder for extruding thermoplastic polymer melts, said extruder comprising a worm cylinder containing a worm and an extrusion die-connecting member having a passage extending from the discharge end of said cylinder toward said die, and an orifice plate interposed between said cylinder and said member and contiguous to the discharge end of said worm, the improvement which comprises the combination aforesaid having an orifice plate comprising a plate member having an orifice-containing portion including a first group of axially diagonal orifices extending from the periphery to the central part of said portion, a second group of axially diagonal orifices extending from the central part to the periphery of said portion, and a plurality of axially parallel orifices extending through both the central part and periphery of said portion.

10. The improvement as claimed in claim 9 wherein said passage of said member has a length sufficient to provide a residence time of melt flowing therethrough to the extrusion die of at least one minute.

11. An improvement as claimed in claim 9 wherein at least a portion of said orifices has on at least one of the upstream and downstream faces of said plate countersunk zones about the orifice openings.

12. An improvement as claimed in claim 11 wherein peripheral portions of adjacent countersunk zones substantially touch or overlap and said countersunk zones contiguous to the radially central zone of said orifice-containing portion at least approximately intersect the radial center of said portion.

13. An improvement as claimed in claim 9 wherein the cross sections of said orifices having the longer lengths are greater than the cross sections of said orifices having the shorter lengths, said cross sections being predetermined to provide substantially equal flow resistance in all of said orifices.

14. An improvement as claimed in claim 9 wherein the orifice-containing portion of said orifice plate has a conically countersunk upstream face and a conical downstream face.

15. An improvement as claimed in claim 9 wherein said passage extending from said discharge end of said cylinder toward said die contains at least two axially spaced, stationary orifice plates, each orifice plate comprising a plate member having an orifice-containing portion including a first group of axially diagonal orifices extending from the periphery to the central part of said portion, a second group of axially diagonal orifices extending from the central part to the periphery of said portion, and a plurality of axially parallel orifices extending through both the central part and periphery of said portion.

16. An orifice plate as claimed in claim 1, said orifice-containing portion further including a third group of radially intermediate, axially diagonal orifices of smaller cross section than the cross sections of said orifices of said first and second groups.

17. An orifice plate as claimed in claim 9, said orifice-containing portion further including a third group of radially intermediate, axially diagonal orifices of smaller cross section than the cross sections of said orifices of said first and second groups.

References Cited

UNITED STATES PATENTS

| 2,971,219 | 2/1961 | Hill | 18—(12 B) |
| 3,171,160 | 3/1965 | Moyer | 18—12 |
| 2,944,286 | 7/1960 | Kullgren et al. | 18—12 |

FRANCIS S. HUSAR, Primary Examiner